Figure 1:
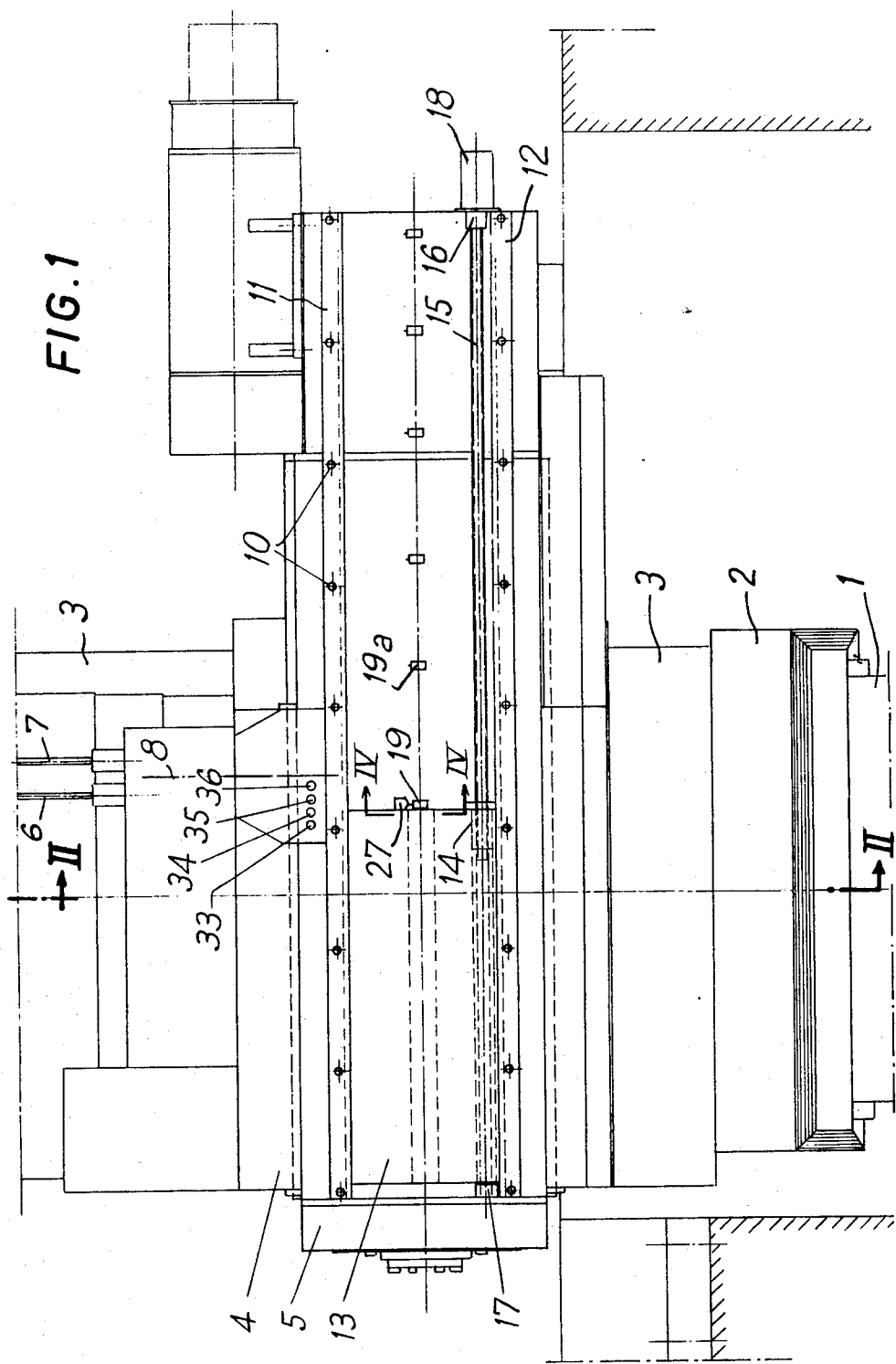

United States Patent [19]

Deflandre

[11] 4,048,902
[45] Sept. 20, 1977

[54] BALANCING AND COMPENSATING ARRANGEMENT

[76] Inventor: René Deflandre, 6, rue Alfred Dehodencq, 75016 Paris, France

[21] Appl. No.: 542,496

[22] Filed: Jan. 20, 1975

[30] Foreign Application Priority Data

Jan. 31, 1974 France .................................. 74.03270

[51] Int. Cl.² .......................... B23Q 5/22; B23C 1/027
[52] U.S. Cl. ............................. 90/11 F; 90/DIG. 28; 408/235
[58] Field of Search ............................. 408/235–237; 90/11 R, 11 F, DIG. 28; 83/808

[56] References Cited

U.S. PATENT DOCUMENTS

| | | | |
|---|---|---|---|
| 1,674,669 | 6/1928 | Stedman | 408/235 |
| 2,346,198 | 4/1944 | Tautz | 408/235 |
| 2,556,240 | 6/1951 | Valentine et al. | 408/235 X |
| 2,983,199 | 5/1961 | Daugherty | 408/235 X |
| 3,049,030 | 8/1962 | Meier | 408/235 |
| 3,168,000 | 2/1965 | Deflandre | 408/235 X |
| 3,546,979 | 12/1970 | Noguchi | 408/235 |
| 3,550,480 | 12/1970 | Müller | 408/237 |
| 3,580,133 | 5/1971 | Berthiez | 408/235 X |
| 3,621,895 | 11/1971 | Leidig | 83/808 X |
| 3,684,395 | 8/1972 | Nurakami | 408/235 |
| 3,707,333 | 12/1972 | Kitamura et al. | 408/235 |
| 3,853,423 | 12/1974 | Quack | 408/235 |

Primary Examiner—Othell M. Simpson
Assistant Examiner—Z. R. Bilinsky
Attorney, Agent, or Firm—Lewis H. Eslinger

[57] ABSTRACT

This invention relates to an arrangement for balancing and compensating for the overhang effect caused by longitudinal movement of a movable part of a machine along a supporting table, in which the said movable part is suspended at a point situated substantially on a vertical line passing through its center of gravity, wherein the said movable part is provided with a counterweight which is movable longitudinally on the said movable part to create a moment which can be adjusted in relation to the point of suspension of the movable part.

6 Claims, 6 Drawing Figures

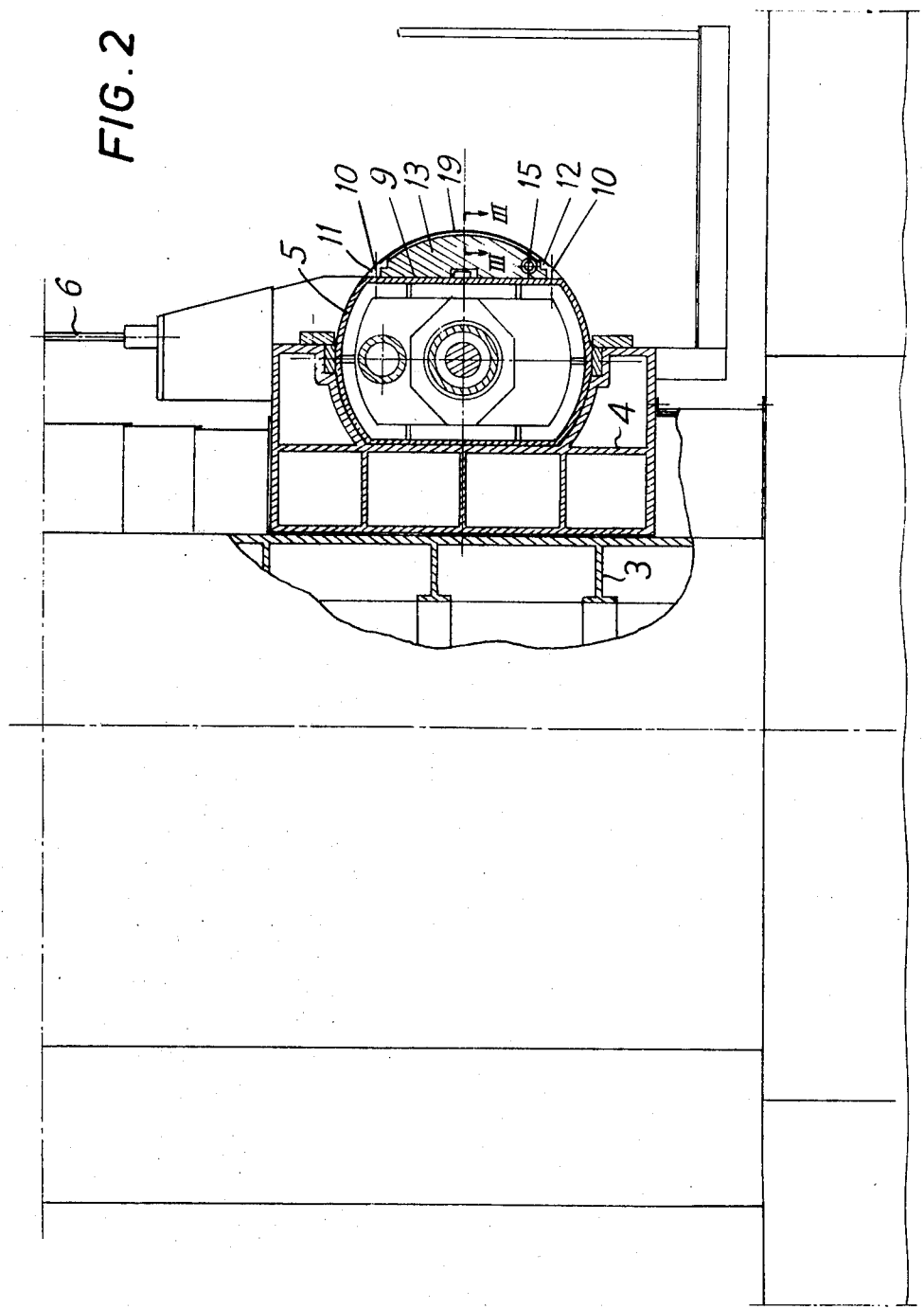

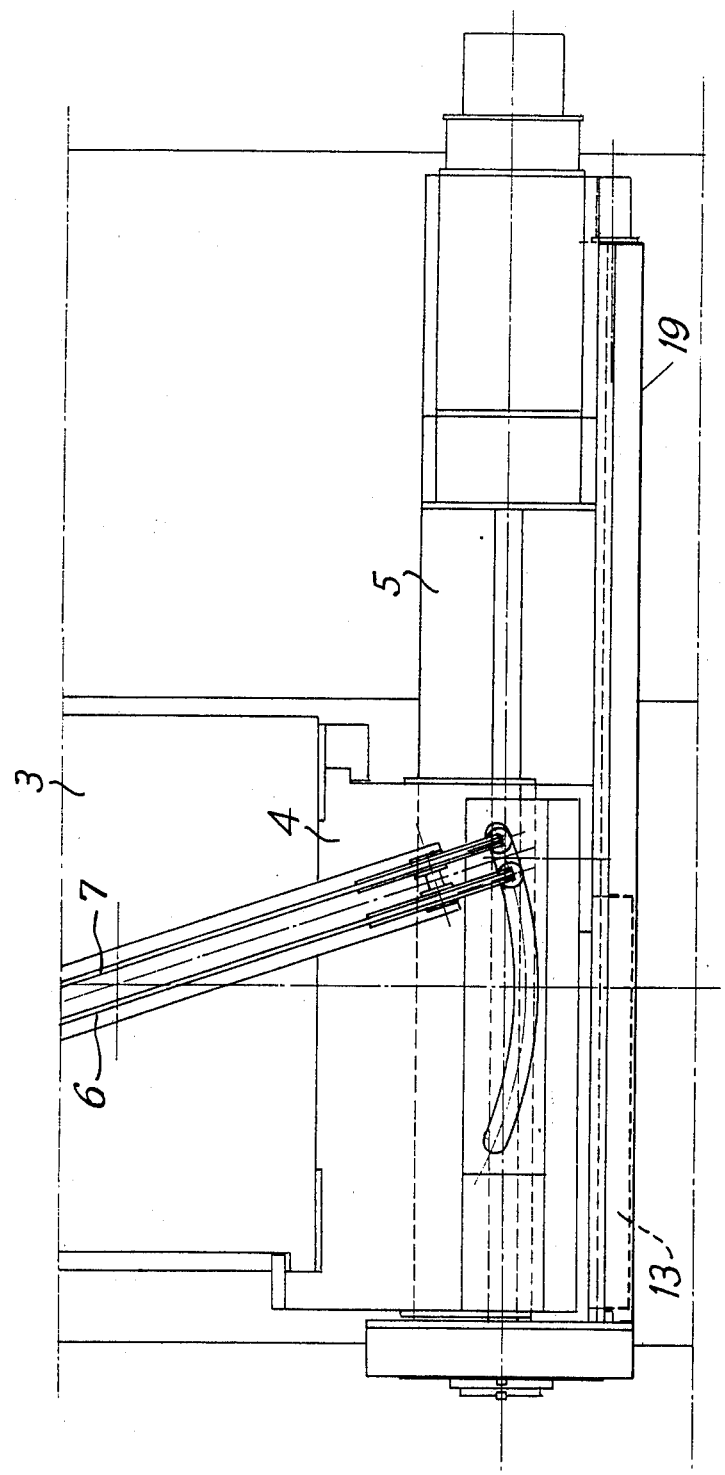

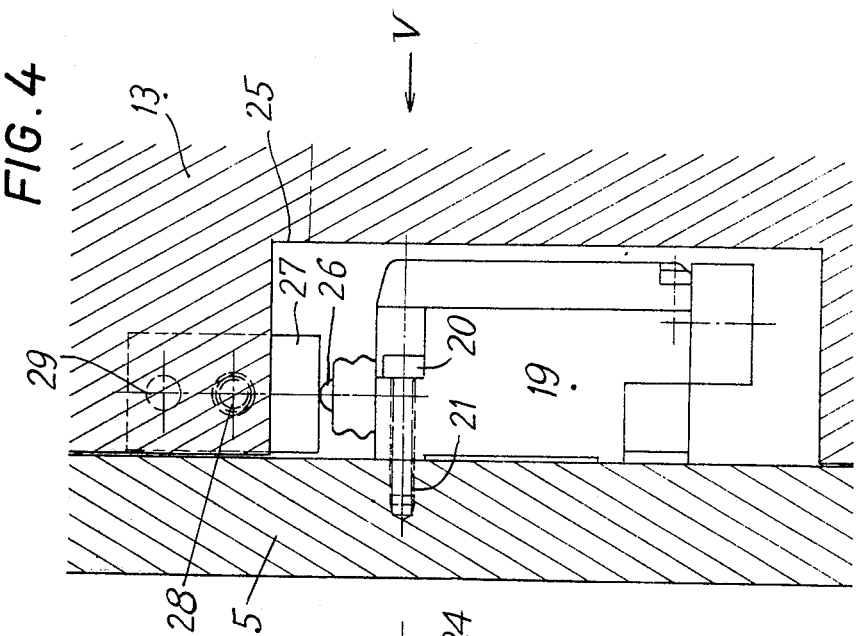
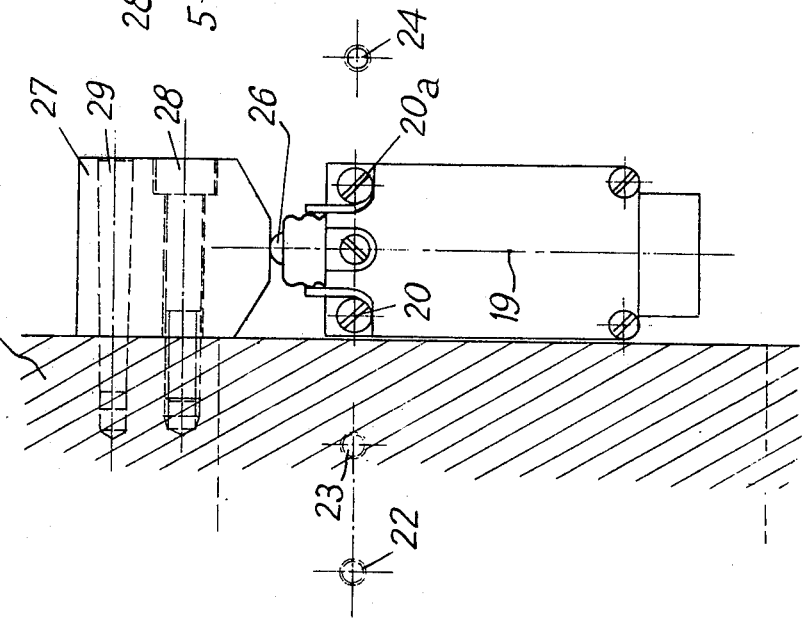

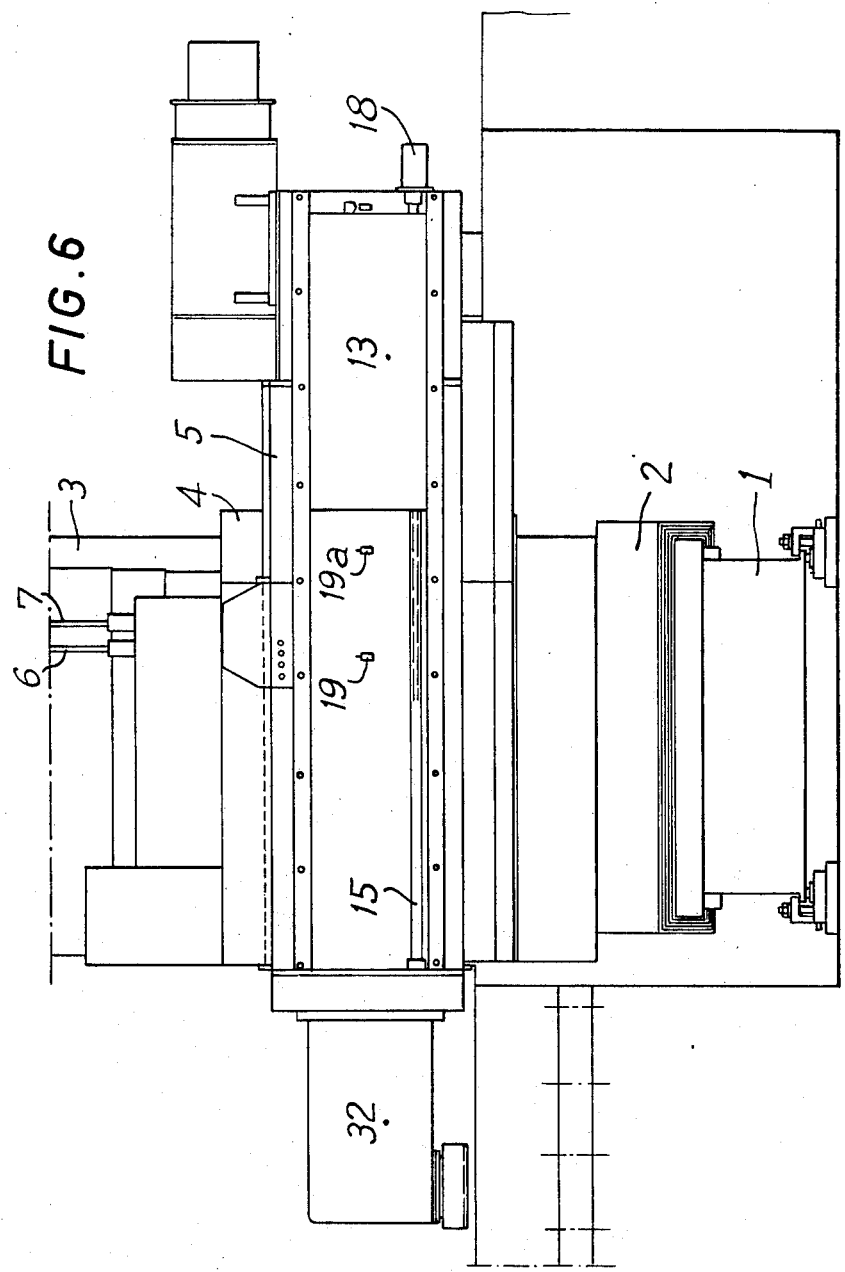

BALANCING AND COMPENSATING ARRANGEMENT

The present invention relates to improvements in balancing arrangements used to compensate for the overhang effect caused by the longitudinal movement of a movable part of a machine along a support bed, and more particularly to such arrangements for the headstocks of milling and boring machines.

French Pat. No: 1,328 950 relates to a balancing arrangement in which the movable part or headstock can only be fitted with machining accessories which are of very small weight in comparison with that of the headstock, which cause no appreciable shift in the centre of gravity of the headstock thereby having little effect on the accuracy of the movement.

However, this is obviously not the case when heavy accessories representing a major overhang are used, such as machining heads which are capable of using all the power available, or very long boring extensions, or large diameter surfacing plates, etc. Such accessories cause a major alteration in the centre of gravity of the head-stock and for this reason the centre of gravity no longer coincides with the point at which the counter-balancing means act on the head stock. The result is a tipping moment which considerably reduces the accuracy with which the longitudinal movement takes place and sometimes reduces it to a level which is unacceptable when working on precision parts.

The invention consists in an arrangement for balancing and compensating for the overhang effect caused by longitudinal movement of a movable part of a machine along a supporting table, in which the said moveable part is suspended at a point situated substantially on a vertical line passing through its centre of gravity, characterised in that the moveable part is provided with a counterweight which is movable longitudinally on the said movable part to create a moment which can be adjusted in relation to the point of suspension of the moveable part.

Where an accessory is fitted to one end of the movable part or head stock, the moment created by the counterweight may be equal to and in the opposite direction (on the opposite side of the centre of gravity of the movable part) from that set up by the accessory in question.

In a preferred embodiment of the invention, the counterweight is movable along a slideway which is provided by retainers attached to the longitudinally extending side face of the movable part of headstock and the counterweight is driven along the slideway by a long rotary screw which is actuated by a drive member which has a built-in brake.

The longitudinal position of the counterweight may be set automatically be means of an actuator which acts on electrical contact members attached to the movable part or headstock each of which corresponds to a specific accessory. The theoretical position of these contact members can be determined by calculation by equalising the tipping moment and the compensating moment.

In view of the fact that certain factors in the calculation such as the weight of the movable part or head stock and the accessory, the play in the guiding retainers, etc., may vary in practice, an empirical check is carried out on every machine using a spirit-level which is set up along the longitudinally extending side face of the movable part or the headstock. The deviations shown by the spirit-level are noted when the movable part of headstock is advanced. These deviations should not exceed a maximum of 0.01mm per meter. If necessary the position of a contact member can then be altered and after it has been adjusted finally the spirit-level is removed from the movable part of headstock.

A multi-position switch may be situated on the longitudinally extending side face of the movable part or headstock, allowing the contact member appropriate to the accessory being used to be brought into action. A precise stop is made possible by the action of the brake which restricts the run-on of the motor after the current has been cut off.

Preferably, at the side of the switch are situated two start buttons for the two directions of movement respectively.

The invention will now be described, by way of example, with reference to the accompanying drawings, in which:

FIG. 1 is a view in side elevation of a milling and boring machine having a movable headstock with an arrangement for balancing and compensating constructed in accordance with the invention, FIG. 2 is a part-sectional front view, the part section being taken along the line II—II of FIG. 1, FIG. 3 is a part-sectional plan view of a part of the machine, the part section being taken along the line III—III of FIG. 2, FIG. 4 is a cross-section, to a larger scale, taken along the line IV—IV of FIG. 1, FIG. 5 is a part-sectional front view looking in the direction of the arrow V of FIG. 4, and FIG. 6 is an identical view to that in FIG. 1 in which the headstock is fitted with an accessory which sets up a maximum tipping moment.

In FIGS. 1, 2 and 3 there is shown a milling and boring machine having a movable headstock of the type described in French Pat. No. 1,328 950 and which comprises a bed 1 on which a base 2 is mounted to slide horizontally. The base 2 is secured to an upright 3 along which a table 4 is movable vertically, the latter serving as a support for a headstock or movable part 5 which in turn is able to move horizontally in relation to the table 4. The headstock 5 is suspended by cables 6, 7 connected to counter-balancing members which are not shown in the drawing and which are arranged at the side opposite to the side on which the table 4 is mounted on the upright 3. The point of suspension of the headstock 5 is represented by an axis 8 and is positioned at the centre of gravity of the headstock 5. To the longitudinally extending side face of the headstock 5 are attached, by screws 10, retainers 11 and 12 for a counterweight 13, which is movable longitudinally along the whole length of the headstock 5. The retainers 11 and 12 form a slideway and act as guides for the counterweight 13.

The counterweight 13 has a threaded collar 14 in which is engaged a screw 15 for moving the counterweight longitudinally and which is mounted to rotate on the head-stock by means of bearings 16, 17. The screw 15 is driven round by an electric motor 18 which is fitted with a built-in brake.

The compensating arrangement including the counterweight 13 is enclosed by a cover 19 (FIGS. 2, 3,) attached to the retainers 11 and 12, the cover not being fitted in FIG. 1.

To control the operation of motor 18, electrical contact members such as 19a 19b are attached to the longitudinally extending side face of the headstock 5 by screws 20, 20a which engage in corresponding internally threaded holes 21 in the headstock 5 (FIGS. 4, 5). Additional internally threaded holes 22, 23, 24 make it possible for contact member 19a to be adjusted at a later stage as dictated by the measurements made with the spirit-level mentioned previously remembering that the spacing between holes 21, 22, 23, 24 is the same as that between screws 20, 20a. Other internally threaded holes, which are not seen in the drawing allow a large range of longitudinal adjustment. To provide for passage of the contact members 19a, 19b and for connecting leads, the counterweight has a longitudinally extending recess 25.

Each contact member 19a, 19b has a depressible plunger 26 which co-operates with an actuator 27 attached to the counterweight 13 by means of a screw 28 and a pin 29. Actuator 27 has two ramps 30, 31 which enable the plunger to be depressed when contacted by the actuator when the counterweight 13 moves in either direction.

In FIGS. 1 and 2 the counterweight 13 is shown at the end of its travel to the left hand end of the headstock 5, this being the appropriate position when the head stock 5 is not fitted with an accessory.

In FIG. 6, on the other hand, the counterweight is shown at the end of its travel to the right hand end of the headstock, this being the position appropriate to instances in which an accessory such as 32 is attached to the left hand end of the headstock 5 and sets up a maximum tipping moment.

Assuming that the counterweight has a weight P, and a travel of length L, then the maximum compensating moment which can be exerted is $P \times L$. Now taking the weight of the accessory 32 as $P_1$ and the distance between its centre of gravity and the axis of suspension 8 as $L_1$, the tipping moment applied is $P_1 \times L_1$.

Since the two moments in question act in opposite directons, it is merely necessary of $P \times L$ to be equal to $P_1 \times L_1$ for the centre of gravity of the headstock when fitted with accessory 32 to remain on the suspension-point axis 8.

The position of the counterweight 13 is decided in the same way for the other types of accessory.

The longitudinal position of the counterweight 13 is set automatically by means of the actuator 27 which acts on the contact members 19a, 19b attached to the head-stock, the position of each of which corresponds to a particular specific accessory.

The theoretical position of these contact members is determined by calculation by equalizing the tipping and compensating moments in the way described above.

If necessary, the position of the contact member may be corrected by means of a spirit-level in the way described above.

Depending upon the number of accessories which create different tipping forces, there are provided one or two multi-position switches 33, 34 (FIG. 1), which are located on the longitudinal side face of the head stock and which allow the appropriate contact member 19a, 19b for the accessory being used to be brought into action.

At one side of the switch or switches are positioned two push-buttons 35, 36 which are associated with a switch which allows the motor 18 to be started up and the counterweight 13 to be moved in one or the other direction.

Various modifications may, of course, be made by the man skilled in the art to the arrangements or methods which have just been described simply as non-limiting examples, without departing from the scope of the invention.

Thus, it should be understood that the invention is not applicable merely to the movable headstocks of milling and boring machines but also to any headstock the position of whose centre of gravity is liable to vary, whether as the result of a matching accessory being fitted or as the result of the movement of use of its own internal parts. This is the case with, for example, headstocks which have a moving slider which is used as a support for milling and boring spindles, or with headstocks which have a movable support to take machining accessories.

An improvement in balancing and compensating arrangements characterised in that the longitudinal position of the counterweight on the movable part is set so as to create a moment equal to the tipping moment set up by an accessory which is mounted at one of the ends of the movable part. An improvement in balancing and compensating arrangements characterised in that the movable part is the headstock of a milling and boring machine which is mounted to slide horizontally on a table and vertically along an upright resting on a bed. An improvement in balancing compensating arrangements characterised in that the counterweight is mounted to slide on a slide-way which is provided with retainers attached to the longitudinally extending side face of the headstock, the said counter weight having a threaded collar in which engages a screw which is mounted to rotate on the headstock and which is driven around by a drive member fitted with a built-in brake. An improvement in balancing and compensating arrangements characterised in that the counterweight has at least one actuator which acts selectively on electrical contact members attached to the headstock which are positioned as a function of the tipping moment set up by the accessory in question, the said contact members controlling the supply to the motor driving the screw which causes the counterweight to move. An improvement in balancing and compensating arrangements characterised in that the contact member in question is brought into action by means of at least one multi-position switch situated on the said side face of the headstock. An improvement in balancing and compensating arrangements characterised in that the motor for moving the counterweight in the two directions in which it can move is started up by means of a switch having two push-buttons which are arranged on the longitudinally extending side face of the headstock.

What is claimed is:

1. An arrangement for balancing and compensating for the overhang effect caused by longitudinal moment of a movable part of a machine along a supporting table, in which the said movable part is suspended at a point situated substantially on a vertical line passing through its center of gravity, wherein the movable part is provided with a counterweight which is movable longitudinally on the movable part to create a moment which can be adjusted in relation to the point of suspension of the movable part; said counterweight including at least one actuator selectively acting on electric contact members fixed to the movable part, said contact members being positioned as a function of the tipping moment of an accessory mounted on the movable part; and means for moving the counterweight along said movable part, said contact members controlling the moving means to stop the displacement of the counterweight by the moving means when the contact members are engaged by the actuator.

2. A balancing arrangement as defined in claim 1, wherein the contact members are activated and controlled by at least one multi-position switch, placed on the movable part.

3. In a milling and boring machine having a headstock mounted thereon for both vertical and horizontal movement and counterbalanced by means of a counteweight operatively connected to the headstock substantially on the vertical line passing through the center of gravity of the headstock, the improvement which comprises a second counterweight slidably mounted on said headstock for horizontal movement with respect thereto, generally perpendicular to said vertical line, between a plurality of predetermined positions along the headstock to counterbalance work accessories mounted on the headstock; and means for moving said second counterweight along said headstock between said plurality of predetermined positions in accordance with the accessory mounted on the headstock in order to create a moment about said center of gravity of the headstock at the connection between the first mentioned counterweight and the headstock, which is substantially equal to the tipping moment created by the accessory mounted on the headstock; said headstock having an exposed front face and a pair of spaced paralelly extending flanges secured thereto, said counterweight being slidably mounted on said front face of the headstock between said flanges and said moving means comprising an elongated threaded rod rotatably mounted on said headstock for rotation along the rod's longitudinal axis, a threaded nut secured to said counterweight and threadably engaged with said rod, and a motor means for rotating said rod and including a brake therein to stop rotation of the rod when the motor means is shut off.

4. In a milling and boring machine having a headstock mounted thereon for both vertical and horizontal movement and counterbalanced by means of a counterweight operatively connected to the headstock substantially on the vertical line passing through the center of gravity of the headstock, the improvement which comprises a second counterweight slidably mounted on said headstock for horizontal movement with respect thereto between a plurality of positions along the headstock to counterbalance work accessories mounted thereon; and means for moving said second counterweight along said headstock between said predetermined positions including a drive motor operatively connected to the headstock; and a plurality of control switches mounted along the length of said headstock in predetermined positions respectively selected in accordance with the various accessories to be attached to the headstock, said control switches being operatively connected to said motor to stop the drive of the motor, and a contact means mounted on said second counterweight in a predetermined position for operating the switches as the counterweight is moved by the motor thereby to stop the counterweight in said predetermined positions.

5. In a milling and boring machine as defined in claim 4 including means for selectively activating said switches to control said motor means whereby the drive of the motor means is stopped only when said contact means engages the activated switch.

6. In a milling and boring machine as defined in claim 5 wherein said motor means is reversible; and switch means operatively connected to the motor means for determining the drive direction of the motor means.

* * * * *